US008299168B2

(12) United States Patent
Münzmay et al.

(10) Patent No.: US 8,299,168 B2
(45) Date of Patent: Oct. 30, 2012

(54) SILOXANE-CONTAINING BINDER DISPERSIONS

(75) Inventors: Thomas Münzmay, Dormagen (DE); Alice Münzmay, legal representative, Dormagen (DE); Arno Nennemann, Bergisch Gladbach (DE); Markus Mechtel, Bergisch Gladbach (DE); Nusret Yuva, Burscheid (DE); Meike Niesten, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 211 days.

(21) Appl. No.: 12/338,419

(22) Filed: Dec. 18, 2008

(65) Prior Publication Data

US 2009/0163648 A1 Jun. 25, 2009

(30) Foreign Application Priority Data

Dec. 19, 2007 (DE) ........................ 10 2007 061 875

(51) Int. Cl.
*C09D 183/06* (2006.01)
*C08L 83/06* (2006.01)
*C08L 33/00* (2006.01)

(52) U.S. Cl. ........................................ 524/588; 524/522

(58) Field of Classification Search ........................ None
See application file for complete search history.

(56) References Cited

U.S. PATENT DOCUMENTS

| | | | | |
|---|---|---|---|---|
| 4,774,278 | A | 9/1988 | Yoshioka et al. | |
| 4,886,551 | A * | 12/1989 | Fink et al. | 106/287.14 |
| 5,120,812 | A * | 6/1992 | O'Lenick et al. | 528/28 |
| 5,175,327 | A * | 12/1992 | Parkinson et al. | 556/446 |
| 5,196,499 | A * | 3/1993 | O'Lenick, Jr. | 528/15 |
| 5,248,783 | A * | 9/1993 | O'Lenick | 548/110 |
| 5,296,625 | A * | 3/1994 | O'Lenick et al. | 556/437 |
| 5,430,083 | A | 7/1995 | Klier et al. | |
| 6,020,419 | A * | 2/2000 | Bock et al. | 524/590 |
| 6,720,072 | B1 | 4/2004 | Hinterwaldner et al. | |
| 2001/0056154 | A1* | 12/2001 | Blum et al. | 524/522 |
| 2002/0004054 | A1* | 1/2002 | Calello et al. | 424/400 |
| 2007/0055016 | A1 | 3/2007 | Niesten et al. | |
| 2008/0017071 | A1 | 1/2008 | Moebus et al. | |
| 2008/0214766 | A1* | 9/2008 | Munzmay et al. | 526/329.7 |
| 2009/0105409 | A1* | 4/2009 | Munzmay et al. | 524/560 |

FOREIGN PATENT DOCUMENTS

| | | | |
|---|---|---|---|
| DE | 19846660 | A1 | 4/2000 |
| EP | 0329260 | A2 | 8/1989 |
| WO | WO-91/18954 | A1 | 12/1991 |
| WO | WO-00/39181 | A1 | 7/2000 |
| WO | WO-03/044099 | A1 | 5/2003 |
| WO | WO-2004/035474 | A1 | 4/2004 |
| WO | WO-2006/008120 | A1 | 1/2006 |
| WO | WO-2007/025670 | A1 | 3/2007 |

* cited by examiner

*Primary Examiner* — Robert S Loewe
(74) *Attorney, Agent, or Firm* — Connolly Bove Lodge & Hutz LLP

(57) ABSTRACT

The invention relates to aqueous formulations comprising organic binders having a siloxane content and inorganic nanoparticles, a process for the preparation thereof and the use thereof for the preparation of aqueous coating compositions.

18 Claims, No Drawings

SILOXANE-CONTAINING BINDER DISPERSIONS

RELATED APPLICATIONS

This application claims benefit to German Patent Application No. 10 2007 061 875.3, filed Dec. 19, 2007, which is incorporated herein by reference in its entirety for all useful purposes.

BACKGROUND OF THE INVENTION

The invention relates to aqueous formulations comprising organic binders having a siloxane content and inorganic nanoparticles, a process for the preparation thereof and the use thereof for the preparation of aqueous coating compositions.

In modern lacquering concepts of automobiles, clear lacquer plays an essential role as the top layer. In this context, in addition to aesthetic effects, such as high gloss and transparency, the protective function of the clear lacquer is an essential aspect. The clear lacquer protects the underlying lacquer layers against external influences, such as sunlight, water, solvents and aggressive chemicals, and last but not least against mechanical stress. The scratch resistance of automobile clear lacquers is therefore still an essential criterion for the quality of an automobile clear lacquer.

Nanoparticles in polymeric coatings can improve properties such as scratch resistance, UV protection or conductivity in a targeted manner. Control of the surface modification and dispersion of the nanoparticles determines the required transparent appearance of the coatings and the properties thereof.

Various approaches have been pursued in the past for introduction of the nanoparticles into coating composition formulations. In this context, the particles can be mixed directly into the resin or curing agent component or into the coating composition ready for application. In aqueous systems there is the possibility of dispersing the particles in the aqueous phase. The in situ preparation of the particles in one of the binder components and adaptation of the surface to either the resin or the curing agent component have furthermore been described.

From the practical point of view, it is advantageous to disperse the nanoparticles as stable masterbatches in one of the components, so that a long-term storage stability and a simple ease of handling in the formulation of lacquers is ensured. In the end use, the nanoparticles must likewise be readily dispersible in a finely divided manner, so that advantageous properties such as transparency, scratch resistance or conductivity result.

In practice, the nanoparticles are conventionally dispersed into the resin component, into the aqueous phase or into the finished mixture of curing agent and resin shortly before curing. As a rule, for this it is necessary to adapt the surface of the nanoparticles to the specific matrix of the coating composition or of the adhesive. The disadvantage of simple mixing in of modified nanoparticles is the dependency of the stability on the complete formulation, i.e. on all the formulation constituents. Variation of one parameter can lead here to demixing (Pilotek, Steffen; Tabellion, Frank (2005), European Coatings Journal, 4, 170 et seq.).

The use of polydimethylsiloxanes (PDMS) for the modification of lacquer systems is known from the prior art. Due to the high surface tension of PDMS, specific properties are generated, such as good surface wetting, slip resistance and an easy-to-clean surface (Reusmann in Farbe und Lack, 105, volume 8/99, page 40-47, Adams in Paintindia, October 1996, page 31-37).

In order to ensure good incorporation of PDMS and to avoid migration of the PDMS as greatly as possible, organofunctional PDMS types, such as alkyleneamine- or alkylenehydroxy-functional PDMS derivatives, are often used. Such lacquer systems are described e.g. in WO91/18954, EP-A 0 329 260 or U.S. Pat. No. 4,774,278.

Nevertheless, the amine-functional PDMS types have the disadvantage that the pot life of polyurethane systems based on these is shortened in an extreme manner because of the high tendency towards formation of urea.

The known hydroxy-functional PDMS types indeed lead to improved pot lives, but as a rule they show incompatibilities with the polyisocyanate component so that no homogeneous films can be produced and the crosslinking takes place only incompletely. As a result, free non-bonded PDMS is present in the lacquer, which in time migrates out of the coating and leads to a deterioration in the properties of the coating.

WO-A 2007/025670 discloses two-component coating compositions which comprise as a binder a polyisocyanate component in combination with a reactive component which is reactive towards isocyanate groups, in particular a polyhydroxy component. The compositions described there are suitable for the production of high quality coatings which are distinguished in particular by improved easy-to-clean properties due to a highly functional hydroxy-polydimethylsiloxane unit, while the hardness and resistance to ethanol are not improved. An improvement in the scratch resistance is not described and also was not detectable.

There is therefore still an urgent need to provide aqueous automobile clear lacquers which have an improved scratch resistance with good optical properties.

It has now been found, surprisingly, that aqueous copolymers which contain polyorganosiloxanes containing hydroxyl groups are suitable, in combination with inorganic nanoparticles, for the production of coatings having a significantly improved scratch resistance with excellent gloss and very low haze (cloudiness).

The object of the present invention was therefore to provide high quality coating compositions, in particular as automobile clear lacquers, which have an optimum gloss and haze and show an improved scratch resistance. The dispersions should furthermore be sufficiently stable to storage.

EMBODIMENTS OF THE INVENTION

An embodiment of the present invention is an aqueous formulation comprising

A) a copolymer a1) and a polyorganosiloxane a2) containing hydroxyl groups;

B) optionally surface-modified inorganic particles which have an average particle size (z-mean), as determined by means of dynamic light scattering in dispersion, of less than 200 nm; and C) water.

Another embodiment of the present invention is the above aqueous formulation, wherein said polyorganosiloxane a2) is a compound of formula (I)

(I)

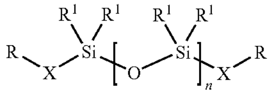

wherein

X is an aliphatic, optionally branched $C_1$ to $C_{10}$ radical or a [—$CH_2$—O—$(CH_2)_p$—]Si unit, wherein r in an integer from 1 to 4;

R is a CH(OH)Y group, wherein

Y is a —$CH_2$—N($R^2R^3$) group, wherein $R^2$ is H, a methyl, ethyl, n-propyl, iso-propyl, or cyclohexyl radical, or a 2-hydroxyethyl, 2-hydroxypropyl, or 3-hydroxypropyl radical; and $R^3$ is a 2-hydroxyethyl, 2-hydroxypropyl, or 3-hydroxypropyl radical;

$R^1$ is, identically or differently hydrogen or a $C_1$- to $C_{10}$-hydrocarbon radical optionally containing hetero atoms; and n is an integer from 1 to 40.

The aqueous formulation of claim 2, wherein r is 3

Another embodiment of the present invention is the above aqueous formulation, wherein said polyorganosiloxane a2) is a compound of formula (V)

(V)

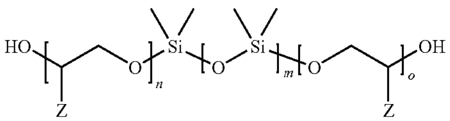

wherein m is an integer from 5 to 15;

z is H or methyl; and n and o are, identically or differently, integers from 1 to 12.

Another embodiment of the present invention is the above aqueous formulation, wherein said polyorganosiloxane a2) is a compound of formula (VI)

(VI)

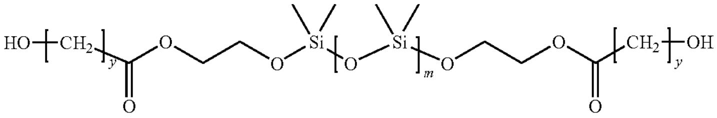

wherein m is an integer from 5 to 15; and y is an integer from 2 to 4.

Another embodiment of the present invention is the above aqueous formulation, wherein said copolymer a1) is built up from I) a hydroxy-functional hydrophobic polymer containing as builder monomers Ia) (meth)acrylic acid esters having $C_1$- to $C_{18}$-hydrocarbon radicals in the alcohol part and/or vinylaromatics and/or vinyl esters; and Ib) hydroxy-functional monomers; and II) a hydroxy-functional hydrophilic polymer containing as builder components IIa) (meth)acrylic acid esters having $C_1$- to $C_{18}$-hydrocarbon radicals in the alcohol part and/or vinylaromatics and/or vinyl esters;

IIb) hydroxy-functional monomers; and

IIc) acid-functional monomers.

Another embodiment of the present invention is the above aqueous formulation, wherein said compound of formula (I) has a number-average molecular weight in the range of from 200 to 3,000 g/mol and an average OH functionality of at least 1.8.

Another embodiment of the present invention is the above aqueous formulation, wherein said compound of formula (I) has a number-average molecular weight of from 250 to 2,250 g/mol.

Another embodiment of the present invention is the above aqueous formulation, wherein said optionally surface-modified inorganic particles of B) are selected from the group consisting of inorganic oxides, mixed oxides, carbides, borides, and nitrides of elements of main group II to IV and/or elements of subgroup I to VIII of the periodic table, including the lanthanides.

Another embodiment of the present invention is the above aqueous formulation, wherein said optionally surface-modified inorganic particles of B) are inorganic nanoparticles in colloidally disperse form in organic solvents or in water.

Another embodiment of the present invention is the above aqueous formulation, wherein B) are inorganic particles in the form of their aqueous formulations.

Another embodiment of the present invention is the above aqueous formulation, wherein B) are surface-modified inorganic nanoparticles.

Yet another embodiment of the present invention is an aqueous coating composition comprising the above aqueous formulation and at least one crosslinking agent.

Yet another embodiment of the present invention is a two-component aqueous coating composition comprising the above aqueous formulation and a polyisocyanate.

Yet another embodiment of the present invention is a clear lacquer comprising the above aqueous formulation.

DESCRIPTION OF THE INVENTION

The present invention therefore provides aqueous formulations comprising

A) a copolymer a1) and polyorganosiloxanes a2) containing hydroxyl groups,

B) inorganic particles which are optionally surface-modified and have an average particle size (z-mean), determined by means of dynamic light scattering in dispersion, of less than 200 nm and C) water.

The polyorganosiloxanes a2) containing hydroxyl groups are compounds according to the general formula (I)

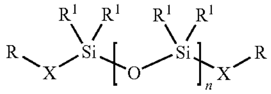

(I)

in which

X is an aliphatic, optionally branched $C_1$ to $C_{10}$ radical, preferably a methyl, ethyl, n-propyl, iso-propyl, n-butyl, iso-butyl or tert-butyl radical, particularly preferably a methyl radical, or a [—$CH_2$—O—$(CH_2)_p$—]Si unit, where r=1 to 4, preferably where r=3

R is a CH(OH)Y group, in which

Y is a —$CH_2$—$N(R^2R^3)$ group, wherein $R^2$ can be an H, a methyl, ethyl, n-propyl, iso-propyl or cyclohexyl radical or a 2-hydroxyethyl, 2-hydroxypropyl or 3-hydroxypropyl radical and $R^3$ can be a 2-hydroxyethyl, 2-hydroxypropyl or 3-hydroxypropyl radical, $R^1$ can be identical or different and is hydrogen or a $C_1$- to $C_{10}$-hydrocarbon radical optionally containing hetero atoms and n is 1 to 40.

The copolymer a1) is built up from

I) a hydroxy-functional hydrophobic polymer containing as builder monomers

Ia) (meth)acrylic acid esters having $C_1$- to $C_{18}$-hydrocarbon radicals in the alcohol part and/or vinylaromatics and/or vinyl esters, Ib) hydroxy-functional monomers and II) a hydroxy-functional hydrophilic polymer containing as builder components IIa) (meth)acrylic acid esters having $C_1$- to $C_{18}$-hydrocarbon radicals in the alcohol part and/or vinylaromatics and/or vinyl esters, IIb) hydroxy-functional monomers and IIc) acid-functional monomers.

The content of monomers Ia)/IIa) in the copolymer a1) is 34.3 to 89.4 parts by wt., preferably 51.8 to 85.3 parts by wt. and particularly preferably 58 to 81.5 parts by wt., the content of monomers Ib)/IIb) in the copolymer a2) is 10 to 65 parts by wt., preferably 13.5 to 46.5 parts by wt. and particularly preferably 17.25 to 40 parts by wt., and the content of monomers IIc) in the copolymer a2) is 0.6 to 12 parts by wt., preferably 1.2 to 5.5 parts by wt. and particularly preferably 1.25 to 3.5 parts by wt.

Suitable monomers Ia)/IIa) are the esterification products of acrylic or methacrylic acid with simple alcohols, e.g. ethyl acrylate, ethyl methacrylate, n-butyl acrylate, iso-butyl acrylate, tert-butyl acrylate, 2-ethylhexyl acrylate, 2-ethylhexyl methacrylate, methyl methacrylate, n-butyl methacrylate, iso-butyl methacrylate, tert-butyl methacrylate, cyclohexyl acrylate or cyclohexyl methacrylate, and vinylphenyls, such as styrene, vinyltoluene, α-methylstyrene or mixtures of these and other monomers.

Further compounds of the (meth)acrylic acid ester type which are suitable as monomers Ia)/IIa) are the esters of acrylic acid or methacrylic acid with linear aliphatic monools having eight carbon atoms, such as e.g. the so-called fatty alcohols (monools), or with linear aliphatic saturated alcohols which are derived from naturally occurring fatty acids, such as lauryl ($C_{12}$), myristyl ($C_{14}$), palmityl ($C_{16}$) or stearyl ($C_{18}$) alcohol. Aliphatic saturated alcohols which are likewise suitable are e.g. n-octanol, nonanol or n-decanol. Suitable monomers of the (meth)acrylic acid ester type which contain an aliphatic radical having at least eight carbon atoms are e.g. n-octyl acrylate, nonyl acrylate, n-decyl acrylate, lauryl acrylate, myristyl acrylate, palmityl acrylate, stearyl acrylate and the corresponding methacrylic acid derivative.

Monomers of the abovementioned type which are furthermore suitable are esters of acrylic acid or methacrylic acid with cycloaliphatic alcohols (monools) having at least 10 carbon atoms, such as e.g. i-bornyl acrylate, n-bornyl methacrylate, dihydroxydicyclopentadienyl acrylate or 3,3,5-trimethylcyclohexyl methacrylate.

Suitable monomers Ia/IIa) are furthermore the esterification products of vinyl alcohol with linear or branched aliphatic carboxylic acids, such as, for example, vinyl acetate, vinyl propionate or vinyl butyrate. Vinyl esters which are preferred are those of branched aliphatic carboxylic acids of the general formula (II)

(II)

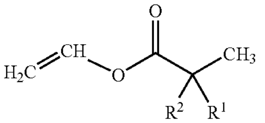

in which $R^1$ and $R^2$ are saturated alkyl groups containing together 6, 7 or 8 C atoms, corresponding to the compounds VeoVa™ 9, 10 and 11.

The monomers mentioned differ with respect to the glass transition temperature of their homopolymers:

| Monomer | $T_G$ [° C.] |
|---|---|
| VeoVa ™ 9 | +70 |
| VeoVa ™ 10 | −3 |
| VeoVa ™ 11 | −40 |

Preferred monomers Ia)/IIa) are n-butyl acrylate, iso-butyl acrylate, tert-butyl acrylate, 2-ethylhexyl acrylate, methyl methacrylate, n-butyl methacrylate, iso-butyl methacrylate, tert-butyl methacrylate, cyclohexyl acrylate, cyclohexyl methacrylate, i-bornyl acrylate, i-bornyl methacrylate and styrene, and n-butyl acrylate, 2-ethylhexyl acrylate, methyl methacrylate, n-butyl methacrylate, tert-butyl methacrylate, cyclohexyl methacrylate, i-bornyl acrylate, i-bornyl methacrylate and styrene are particularly preferred.

Further monomers which are capable of free-radical copolymerization can also optionally be employed as compounds of component Ia/IIa) in the preparation of copolymer a1). These can be, for example, derivatives of acrylic or methacrylic acid, such as acrylamide, methacrylamide, acrylonitrile or methacrylonitrile. Vinyl ethers or vinyl acetates are furthermore optionally possible. Possible further components Ia/IIa) which are optionally to be employed in minor amounts are (meth)acrylate monomers which are difunctional or more than difunctional and/or vinyl monomers, such as e.g. hexanediol di(meth)acrylate or divinylbenzene.

Suitable hydroxy-functional monomers Ib)/IIb) are e.g. 2-hydroxyethyl methacrylate, 2-hydroxypropyl methacrylate, 2-hydroxyethyl acrylate, 2-hydroxypropyl acrylate, 4-hydroxybutyl acrylate or 4-hydroxybutyl methacrylate. Preferred monomers Ib)/IIb) are 2-hydroxyethyl acrylate, 2-hydroxyethyl methacrylate, 2-hydroxypropyl methacrylate or 4-hydroxybutyl acrylate and mixtures of these compounds.

Suitable olefinically unsaturated acid-functional monomers IIc) are sulfonic or carboxylic acid-functional monomers, preferably carboxylic acid-functional monomers, such as acrylic acid, methacrylic acid, β-carboxyethyl acrylate, crotonic acid, fumaric acid, maleic anhydride, itaconic acid or monoalkyl esters of dibasic acids or anhydrides, such as e.g. maleic acid monoalkyl esters, and acrylic or methacrylic acid are particularly preferred.

Unsaturated compounds which can undergo free-radical polymerization and have phosphate or phosphonate, or sulfonic acid or sulfonate groups, such as are described e.g., in WO-A 00/39181 (p., 1. 13-p. 9, 1. 19) are furthermore also suitable as compounds of component IIc).

Suitable initiators for the polymerization reaction are organic peroxides, such as di-tert-butyl peroxide, di-tert-amyl peroxide or tert-butyl peroxy-2-ethylhexanoate, and azo compounds, such as azodiisobutyric acid nitrile (AIBN). The amounts of initiator employed depend on the desired molecular weight. For reasons of process reliability and easier handling, peroxide initiators can also be employed as a solution in suitable organic solvents of the type mentioned in the following.

The preparation of the copolymer a1) is carried out by a copolymerization, initiated by free radicals, of the monomer mixture I) and II) in organic solvent (mixtures). The amount of organic solvents is chosen such that the resulting solutions of the copolymers a1) have a solids content of from 95 to 60 wt. %, preferably 92.5 to 80 wt. %.

The procedure for polymerization of the unsaturated monomers is familiar per se to the person skilled in the art. Typically, for this, a suitable solvent is initially introduced into a reaction vessel and the unsaturated monomers are polymerized in the feed process using a free radical initiator.

Possible suitable organic solvents are any desired solvents known in lacquer technology, preferably those which are conventionally employed as co-solvents in aqueous dispersions, such as e.g. alcohols, ethers, alcohols containing ether groups, esters, ketones or non-polar hydrocarbons, e.g. aliphatic or aromatic hydrocarbons or mixtures of these solvents.

The preparation of component a1) is carried out by a two-stage addition and polymerization of the monomer mixtures I) and II) in the sequence mentioned. In this context, in a first step (i) a hydroxy-functional hydrophobic polymer I) having an OH number of from 12 to 250 mg of KOH/g of solid, preferably from 50 to 200 mg of KOH/g of solid, is prepared from the monomers Ia) and Ib). In a subsequent step (ii), the hydroxy-functional hydrophilic polymer II) is prepared from the monomers IIa) to IIe) in the solution of the polymer I) obtained from step (i), this hydroxy-functional hydrophilic polymer II) having an OH number of from 20 to 250 mg of KOH/g of solid, preferably from 120 to 220 mg of KOH/g of solid, and an acid number of from 50 to 250 mg of KOH/g of solid, preferably from 110 to 200 mg of KOH/g of solid.

The copolymers a1) have molecular weights of from 1,000 to 50,000 Da, preferably from 1,200 to 20,000 Da and particularly preferably from 1,500 to 12,500 Da.

Organic amines or water-soluble inorganic bases can be employed for neutralization of the carboxyl groups copolymerized into the copolymer a1). N-Methylmorpholine, triethylamine, dimethylethanolamine, dimethylisopropanolamine, methyl-diethanolamine, triethanolamine or ethyldiisopropylamine are preferred. Diethyl-ethanolamine, butanolamine, morpholine, 2-aminomethyl-2-methyl-propanol or isophoronediamine are likewise suitable.

The neutralizing agent is added in amounts such that the degree of neutralization is 70 to 130%, preferably 90 to 105% of the carboxyl groups, an amount of neutralizing agent such that after conversion of all the carboxyl groups into the salt form free neutralizing agent is still present particularly preferably being added. This corresponds to a degree of neutralization of >100%.

Suitable polyorganosiloxanes a2) of the general formula (I) containing hydroxyl groups are characterized by a number-average molecular weight of from 200 to 3,000 g/mol and an average OH functionality of ≧1.8.

The polyorganosiloxanes a2) of the general formula (I) containing hydroxyl groups preferably have number-average molecular weights of from 250 to 2,250 g/mol, particularly preferably from 350 to 1,500 g/mol.

The polyorganosiloxanes a2) of the general formula (I) containing hydroxyl groups are obtainable by reacting corresponding epoxy-functional polyorganosiloxanes with hydroxyalkyl-functional amines, preferably in a stoichiometric ratio of epoxide group to amino function.

The epoxy-functional siloxanes employed for this preferably contain 1 to 4, particularly preferably 2 epoxide groups per molecule. They furthermore have number-average molecular weights of from 150 to 2,000 g/mol, preferably from 250 to 1,500 g/mol, very particularly preferably from 250 to 1,250 g/mol.

Preferred epoxy-functional siloxanes are α,ω-epoxysiloxanes corresponding to the formula (III)

(III)

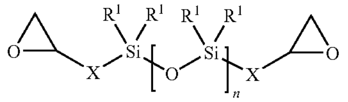

in which

X is an aliphatic, optionally branched $C_1$ to $C_{10}$ radical, preferably a methyl, ethyl, n-propyl, iso-propyl, n-butyl, isobutyl or tert-butyl radical, particularly preferably a methyl radical, or a $[—CH_2—O—(CH_2)_p]—Si$ unit, where r=1 to 4, preferably where r=3, $R^1$ can be identical or different and is hydrogen or a $C_1$- to $C_{10}$-hydrocarbon radical optionally containing hetero atoms and n is 1 to 40.

$R^1$ in the formulae (I) and (III) is preferably phenyl, alkyl, aralkyl, fluoroalkyl, alkylethylene-copropylene oxide groups or hydrogen, wherein phenyl or methyl groups are particularly preferred. $R^1$ is very particularly preferably a methyl group.

Suitable compounds corresponding to formula (III) are, for example, those of the formulae IIIa) and IIIb):

IIIa)

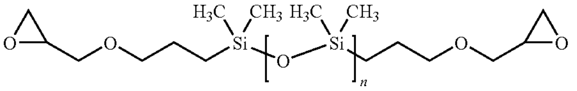

IIIb)

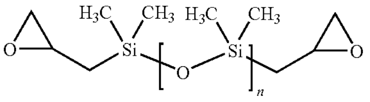

in which n is an integer from 4 to 12, preferably from 6 to 9.

Examples of commercially obtainable products of this series are, for example, CoatOsil® 2810 (Momentive Performance Materials, Leverkusen, Germany) or Tegomer® E-Si2330 (Tego Chemie Service GmbH, Essen, Germany).

Suitable hydroxyalkyl-functional amines correspond to the general formula (IV)

(IV)

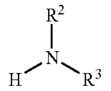

in which $R^2$ can be an i, a methyl, ethyl, n-propyl, iso-propyl or cyclohexyl radical or a 2-hydroxyethyl, 2-hydroxypropyl or 3-hydroxypropyl radical and $R^3$ can be a 2-hydroxyethyl, 2-hydroxypropyl or 3-hydroxypropyl radical.

Preferred hydroxyalkylamines are ethanolamine, propanolamine, diethanolamine, diisopropanolamine, methylethanolamine, ethylethanolamine, propylethanolamine and cyclohexylethanolamine. Diethanolamine, diisopropanolamine or cyclohexylethanolamine are particularly preferred. Diethanolamine is very particularly preferred.

For the preparation of component a2), the epoxy-functional siloxane of the general formula (III) is optionally initially introduced into a solvent and then reacted with the required amount of the hydroxyalkylamine (IV) or a mixture of several hydroxyalkylamines (IV). The reaction temperature is typically 20 to 150° C. and is continued until no further free epoxide groups are detectable.

Hydroxyalkyl-functional siloxanes a2) of the formula (I) which have been obtained by the abovementioned reaction of epoxy-functional polyorganosiloxanes with hydroxyalkylamines are particularly preferably employed.

Particularly preferred polyorganosiloxanes a2) are, for example, those of the formulae Ia) to Ih):

(Ia)

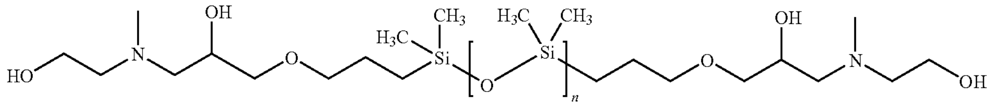

(Ib)

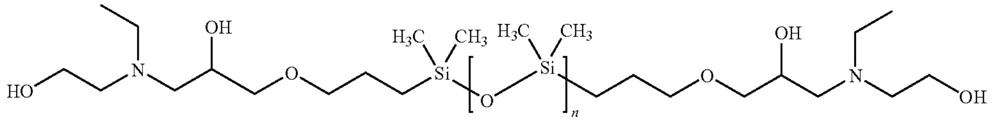

(Ic)

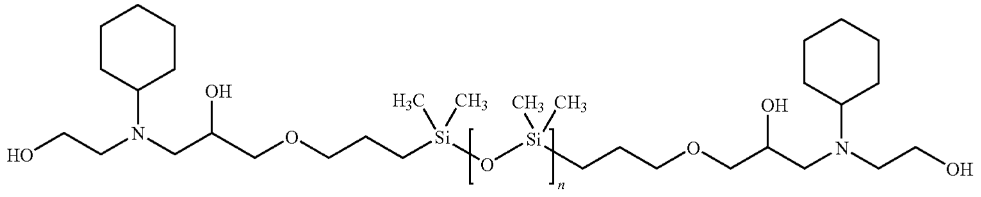

(Id)

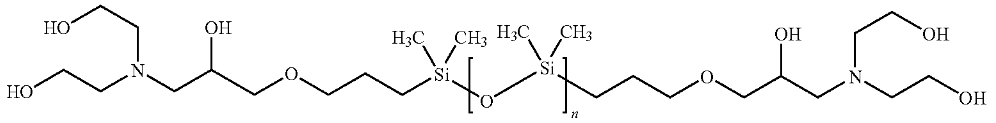

(Ie)

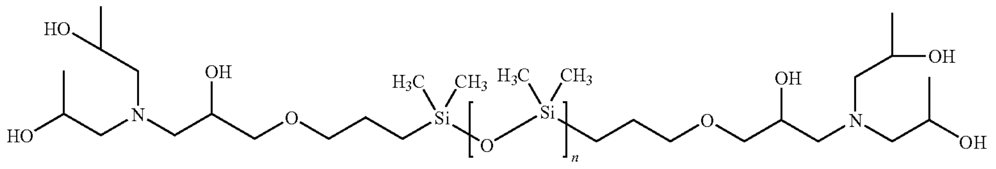

(If)

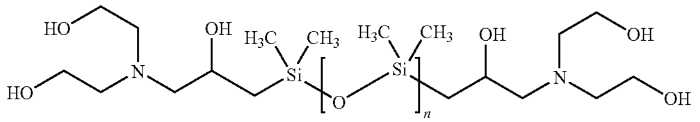

(Ig)

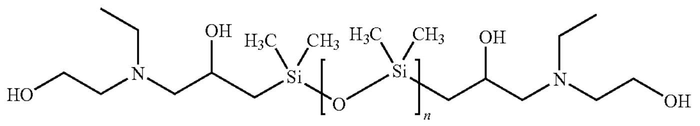

-continued (Ih)

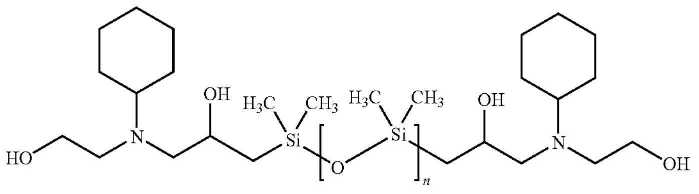

wherein n 4 to 12, preferably 6 to 9.

Siloxanes which are likewise suitable as component a2) are, for example, hydroxyalkyl-functional siloxanes (α,ω-carbinols) corresponding to the formula (V)

(V)

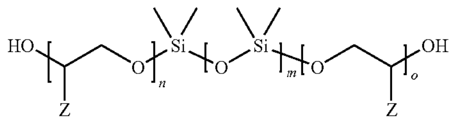

in which m is 5 to 15,

Z is H or methyl, preferably H and n, o is 1 to 12, preferably 1 to 5.

Hydroxyalkyl-functional siloxanes (α,ω-carbinols) of the formula (V) preferably have number-average molecular weights of from 250 to 2,250 g/mol, particularly preferably from 250 to 1,500 gμmol, very particularly preferably from 250 to 1,250 g/mol. Examples of commercially obtainable hydroxyalkyl-functional siloxanes of the type mentioned are Baysilone® OF-OH 502 3 and 6% strength (GE-Bayer Silicones, Leverkusen, Germany).

A further route for the preparation of suitable hydroxy-functional polyorganosiloxanes corresponding to component a2) is the reaction of the abovementioned hydroxyalkyl-functional siloxanes of the α,ω-carbinol type of the formula (V) with cyclic lactones. Suitable cyclic lactones are, for example, ε-caprolactone, γ-butyrolactone or valerolactone.

This is effected in a ratio of OH groups to lactone functions of from 1:2 to 2:1, preferably in a stoichiometric ratio of OH groups to lactone functions. The hydroxyalkyl-functional siloxanes a2) obtained in this way are preferred. Examples of such a compound are polyorganosiloxanes a2) of the general formula (VI)

(VI)

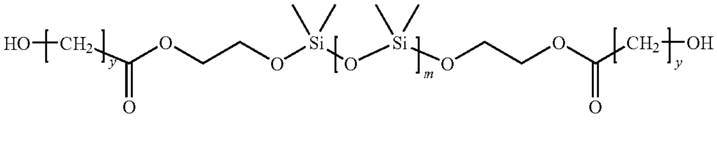

in which m can be 5 to 15 and y can be 2 to 4, preferably 4.

The polyorganosiloxanes a2) containing hydroxyl groups are preferably added to the resin melt of component a2) before dispersion thereof in water and incorporated homogeneously. The polyorganosiloxanes a2) containing hydroxyl groups are particularly preferably incorporated into the resin melt of component a2) simultaneously with the component employed for neutralization of the carboxyl groups incorporated into the copolymer a1).

Possible particles B) are inorganic oxides, mixed oxides, hydroxides, sulfates, carbonates, carbides, borides and nitrides of elements of main group II to IV and/or elements of subgroup I to VIII of the periodic table, including the lanthanides. Preferred particles B) are silicon oxide, aluminium oxide, cerium oxide, zirconium oxide, niobium oxide and titanium oxide, and silicon oxide nanoparticles are particularly preferred.

The particles employed in B) preferably have average particles sizes, determined as the z-mean by means of dynamic light scattering in dispersion, of from 5 to 100 nm, particularly preferably 5 to 50 nm.

Preferably at least 75%, particularly preferably at least 90%, very particularly preferably at least 95% of all the particles employed have the sizes defined above.

The optionally surface-modified nanoparticles B) are introduced during or after the preparation of the mixture of components a1) and a2). This can be carried out by simply stirring in the particles. However, the use of an increased dispersing energy, such as, for example, by ultrasound, jet dispersion or high-speed stirrers according to the rotor-stator principle, is also conceivable. Simple mechanical stirring-in is preferred.

The particles B) can in principle be employed both in powder form and in the form of colloidal suspensions or dispersions in suitable solvents. The inorganic nanoparticles B) are preferably employed in a colloidally disperse form in organic solvents (organosols) or in water.

Suitable solvents for the organosols are methanol, ethanol, i-propanol, acetone, 2-butanone, methyl isobutyl ketone, butyl acetate, ethyl acetate, 1-methoxy-2-propyl acetate, toluene, xylene, 1,4-dioxane, diacetone alcohol, ethylene glycol n-propyl ether or any desired mixtures of such solvents. Suitable organosols have a solids content of from 10 to 60 wt. %, preferably 15 to 50 wt. %. Suitable organosols are, for example, silicon dioxide organosols, such as are obtainable e.g. under the trade names Organosilicasol® and Suncolloid® (Nissan Chem. Am. Corp.) or under the name Highlink®NanO G (Clariant GmbH).

If the nanoparticles are employed in organic solvents (organosols), these are mixed with the mixture of components a1) and a2) before dispersion thereof with water. The resulting mixtures are then dispersed in water by addition of water or by transfer into water. The mixing of the organosols with the mixture of components a1) and a2) can be carried out either before or after neutralization of the carboxyl groups polymerized into the mixture of components a1) and a2). If required, the organic solvent of the organosol can be removed by distillation before or after the dispersing with water, preferably after the dispersing with water.

In the context of the present invention, inorganic particles B) are furthermore preferably used in the form of their aqueous formulations. The use of inorganic particles B) in the form of aqueous formulations of surface-modified inorganic nanoparticles is particularly preferred. These can be modified by silanization, for example, before or at the same time as the incorporation into the silane-modified polymeric organic binder or an aqueous dispersion of the silane-modified polymeric organic binder. This method is known in principle from the literature and is described, for example, in DE-A 19846660 or WO 03/44099.

The surface of the inorganic nanoparticles can furthermore be modified adsorptively/associatively by surfactants or block copolymers, as described, for example, in WO 2006/008120.

Preferred surface modification is the silanization with alkoxysilanes and/or chlorosilanes. Partial modification with γ-glycidoxypropyltrimethoxysilane corresponding to WO 2004/035474 is particularly preferred.

Preferred aqueous commercial nanoparticle dispersions are Levasils® (H.C. Starci GmbH, Goslar, Germany) and Bindzils® (EKA Chemical AB, Bohus, Sweden). Aqueous dispersions of Bindzil® CC 15, Bindzil® CC 30 and Bindzil® CC 40 from EKA (EKA Chemical AB, Bohus, Sweden) are particularly preferably employed.

If the nanoparticles are employed in aqueous form, these are added to the aqueous dispersions of the copolymers a1). In a further embodiment the aqueous nanoparticle colloids are added to the copolymers a1) after neutralization of the carboxyl groups polymerized into the mixture of components a1) and a2) and the mixture is optionally then diluted further with water.

The aqueous formulations according to the invention can be processed to aqueous coating compositions. In this context, by combination with crosslinking agents D), depending on the reactivity or, where appropriate, blocking of the crosslinking agents, both one-component lacquers and two-component lacquers can be prepared. One-component lacquers in the context of the present invention are to be understood here as meaning coating compositions in which the binder component and crosslinking component can be stored together without a crosslinking reaction taking place to an extent which is noticeable or harmful for the later application. The crosslinking reaction takes place only on application after activation of the crosslinking agent. This activation can be effected e.g. by increasing the temperature. Two-component lacquers in the context of the present invention are understood as meaning coating compositions in which the binder component and crosslinking component must be stored in separate vessels because of their high reactivity. The two components are mixed only shortly before application and then in general react without additional activation. However, catalysts can also be employed or higher temperatures applied in order to accelerate the crosslinking reaction.

The present invention therefore also provides aqueous coating compositions comprising the aqueous formulations according to the invention and at least one crosslinking agent D).

Suitable crosslinking agents D) are, for example, polyisocyanate crosslinking agents, amide- and amine-formaldehyde resins, phenolic resins and aldehyde and ketone resins.

Preferred crosslinking agents D) are free or blocked polyisocyanates, which can optionally be hydrophilically modified, and/or non-blocked polyisocyanates which are at least partly hydrophilically modified.

The present invention likewise provides aqueous two-component (2C) coating compositions comprising the aqueous formulations according to the invention and a polyisocyanate. Preferably, at least a proportion of the polyisocyanate is hydrophilically modified.

Suitable polyisocyanates are difunctional isocyanates, such as e.g. isophorone-diisocyanate, hexamethylene-diisocyanate, 2,4- or 2,6-diisocyanatotoluene, 4,4'-diphenylmethane-diisocyanate and/or higher molecular weight trimers thereof, biurets, urethanes, iminooxadiazinedione and/or allophanates. The use of low-viscosity, optionally hydrophilized polyisocyanates of the abovementioned type based on aliphatic or cycloaliphatic isocyanates is particularly preferred.

For the blocking, the abovementioned polyisocyanates are reacted with blocking agents, such as e.g. methanol, ethanol, butanol, hexanol, benzyl alcohol, acetoxime, butanone oxime, caprolactam, phenol, diethyl malonate, dimethyl malonate, dimethylpyrazole, triazole, dimethyltriazole, ethyl acetoacetate, diisopropylamine, dibutylamine, tert-butylbenzylamine, cyclopentanone carboxyethyl ester, dicyclohexylamine and/or tert-butylisopropylamine.

The non-blocked and blocked polyisocyanates can also be converted into a water-dispersible form by incorporation of hydrophilic groups, such as e.g. carboxylate, sulfonate and/or polyethylene oxide structures, and employed in this way in combination with the formulations according to the invention. The blocked polyisocyanates mentioned can also be prepared co-using hydroxy- or amino-functional, also higher molecular weight components, such as e.g. diols, trials, amino alcohols, polyesters, polyethers, polycarbonates and mixtures of the raw materials mentioned and/or other raw materials.

The polyisocyanates employed as crosslinking agent D) in general have a viscosity at 23° C. of from 10 to 5,000 mPas and, if desired for adjusting the viscosity, can also be employed as a mixture with small amounts of inert solvents.

The use of mixtures of various crosslinking agents D) is of course also possible in principle.

The conventional auxiliary substances and additives of lacquer technology, such as e.g. defoaming agents, thickening agents, pigments, dispersing auxiliaries, catalysts, skin prevention agents, antisettling agents or emulsifiers, can be added before, during or after the preparation of the aqueous formulations according to the invention.

The aqueous coating compositions comprising the formulations according to the invention are suitable for all fields of use in which aqueous paint and coating systems with high requirements on the resistance of the films are used, e.g. for coating of mineral building material surfaces, lacquering and sealing of wood and wood materials, coating of metallic surfaces (metal coating), coating and lacquering of asphalt- or bitumen-containing coverings, lacquering and sealing of diverse surfaces of plastic (coating of plastics) and as high gloss lacquers.

The aqueous coating compositions comprising the formulations according to the invention are employed for the preparation of primers, fillers, pigmented or transparent top lacquers, clear lacquers and high gloss lacquers as well as one-coat lacquers, which can be used in individual or series application, e.g. in the field of industrial lacquering and automobile first and repair lacquering.

Curing of the aqueous coating compositions comprising the formulations according to the invention is typically carried out in this context at temperatures of from 0 to 160° C., preferably from 18 to 130° C.

These coatings have, together with very good optical properties of the film, a high level of scratch resistance, resistance to solvents and chemicals, good weather resistance, high hardness and rapid drying.

The coatings can be produced by the various spraying processes, such as, for example, pneumatically or by airless or electrostatic spraying processes, using one- or optionally two-component spraying installations. However, the lacquers and coating compositions comprising the aqueous coating compositions according to the invention can also be applied by other methods, for example by brushing, rolling or knife coating.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless noted otherwise, the percent data are to be understood as percent by weight.

The hydroxyl number (OH number) was determined in accordance with DIN 53240-2.

The viscosity was determined by means of a rotary viscometer "Paar Physica MCR51" in accordance with DINEN ISO 3219.

The acid number was determined in accordance with DIN EN ISO 2114.

Determination of the Particle Size

The particle sizes were determined by means of dynamic light scattering using an BIPPS particle size analyzer (Malvern, Worcestershire, UK). The evaluation was performed via the Dispersion Technology software 4.10. To avoid multiple scattering, a highly dilute dispersion of the nanoparticles was prepared. One drop of a dilute nanoparticle dispersion (approx. 0.1-10%) was introduced into a cell containing approx. 2 ml of the same solvent as the dispersion, the cell was shaken and measurement was carried out in the HPPS analyzer at 20 to 25° C. As is generally known to the person skilled in the art, the relevant parameters of the dispersing medium—temperature, viscosity and refractive index—were entered into the software beforehand. In the case of organic solvents, a glass cell was employed. An intensity- and volume-particle diameter curve and the z-mean for the particle diameter were obtained as the result. It was ensured that the polydispersity index was <0.5.

Bayhydur® XP 2655: hydrophilic aliphatic polyisocyanate based on hexamethylene-diisocyanate, isocyanate content: 21.2±0.5% (Bayer MaterialScience AG/Leverkusen, Germany)

Bindzil® CC40: 40% strength colloidally disperse surface-modified silicon dioxide in water, average particle size 12 nm (EKA Chemical AB, Bohus, Sweden)

Byk® 325: flow auxiliary (Byk-Chemie GmbH, Wesel, Germany)

Byk® 345: wetting additive (Byk-Chemie GmbH, Wesel, Germany)

Desmodur® XP 2410: aliphatic polyisocyanates, isocyanate content: 23.5±0.5% (Bayer MaterialScience Ag/Leverkusen, Germany)

Dowanol® PnB: solvent (Dow Chem. Corp., Horgen, Switzerland)

Rhodiasolv® RPDE: solvent (Rhodia Syntech GmbH, Frankfurt a. M., Germany)

Coatosil® 2810: epoxy-functional polydimethylsiloxane, epoxide content 11.4% (Momentive Performance Materials, Leverkusen, Del.)

Example 1

Hydroxy-Functional Polydimethylsiloxane

In accordance with WO 2007025670 (preparation of polyol I, p. 14), 770 g of the epoxy-functional polydimethylsiloxane CoatOsil® 2810 were initially introduced into the reaction vessel and preheated to 80° C., and 231 g of diethanolamine were added. This mixture was then stirred at 100° C. for 2 hours. The product had an epoxide content of <0.01%, an OH number of approx. 365 mg of KOH/g (11.1%) and a viscosity at 23° C. of approx. 2,900 mPas.

Example 2

Comparison Example 220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 139 g of styrene and 90.4 g of 2-ethylhexyl acrylate was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 100° C. and 31.2 g of N,N-dimethylethanolamine were added. After homogenizing for 30 minutes, dispersing was carried out with 1,245 g of water at 80° C. over a period of 2 hours. A copolymer dispersion having the following data was obtained:

| | | |
|---|---|---|
| OH content (calculated for solids) | 4.5% | |
| Acid number (for solids) | 18.6 | mg of KOH/g |
| Solids content | 44.9% | |
| Viscosity | 2.050 | $mPas_{23° C.}$ |
| pH (10% strength in water) | 8.0 | |
| Degree of neutralization | 105% | |
| Average particle size | 105 | nm |
| Cosolvent | 7.4 | wt. % |

Example 3

According to the Invention 220 g of Dowanol® PnB were initially introduced into a 5 l reaction vessel with a stirring, cooling and heating device and were heated up to 138° C., A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 139 g of styrene and 90.4 g of 2-ethylhexyl acrylate was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 100° C. and 31.2 g of N,N-dimethylethanolamine and 12.5 g of hydroxy-functional polydimethylsiloxane Example 1 were added. After homogenizing for 30 minutes, dispersing was carried out with 1,260 g of water at 80° C. over a period of 2 hours. A copolymer dispersion having the following data was obtained:

| | | |
|---|---|---|
| OH content (calculated for solids) | 4.6% | |
| Acid number (for solids) | 20.1 | mg of KOH/g |
| Solids content | 45.2% | |
| Viscosity | 2,450 | $mPas_{23° C.}$ |
| pH (10% strength in water) | 8.0 | |
| Degree of neutralization | 105% | |
| Average particle size | 125 | nm |
| Cosolvent | 7.4 | wt. % |

Example 4

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 139 g of styrene and 90.4 g of 2-ethylhexyl acrylate was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 100° C. and 31.2 g of N,N-dimethylethanolamine and 12.5 g of Baysilon® OFOH (6%) were added. After homogenizing for 30 minutes, dispersing was carried out with 1,260 g of water at 80° C. over a period of 2 hours. A copolymer dispersion having the following data was obtained:

| | | |
|---|---|---|
| OH content (calculated for solids) | 4.5% | |
| Acid number (calculated for solids) | 19.1 | mg of KOH/g |
| Solids content | 43.6% | |
| Viscosity | 2,200 | $mPas_{23° C.}$ |
| pH (10% strength in water) | 8.2 | |
| Degree of neutralization | 105% | |
| Average particle size | 165 | nm |
| Cosolvent | 7.4 | wt. % |

TABLE 1

Lacquer testing of the examples

| | A | B | C | D | E | F |
|---|---|---|---|---|---|---|
| Example 2 [wt. %] | 340.0 | | | 340.0 | | |
| Example 3 [wt. %] | | 330.5 | | | 330.5 | |
| Example 4 [wt. %] | | | 350.1 | | | 350.1 |
| Byk 345 [wt. %] | 2.8 | 2.7 | 2.8 | 3.0 | 3.0 | 3.0 |
| Byk 325 [wt. %] | 0.9 | 0.9 | 0.9 | 1.0 | 1.0 | 1.0 |
| Bindzil ® CC40 [wt. %] | | | | 30.5 | 30.5 | 30.5 |
| Water [wt. %] | 70.4 | 71.1 | 60.2 | 75.1 | 75.8 | 60.0 |
| Desmodur ® XP 2410 [wt. %] | 74.6 | 74.6 | 74.6 | 74.6 | 74.6 | 74.6 |
| Bayhydur ® XP 2655 [wt. %] | 21.3 | 21.3 | 21.3 | 21.3 | 21.3 | 21.3 |
| Lacquer properties | | | | | | |
| $SiO_2$ nanoparticles calculated for lacquer resin [wt. %] | 0 | 0 | 0 | 8.8 | 8.9 | 8.8 |
| Gloss (20°) | 87 | 87 | 87 | 82 | 86 | 87 |
| Haze (60°) | 9.5 | 9.5 | 10.0 | 25 | 9.5 | 10.0 |
| Scratch resistance [residual gloss %] | 30 | 40 | 45 | 45 | 78 | 65 |

Gloss and Haze

The gloss was measured in accordance with DIN EN ISO 2813. The higher the gloss measurement value, the better the gloss. The haze was measured in accordance with DIN EN ISO 13803. The lower the haze value, the clearer the lacquer.

Scratch Resistance

Testing of the scratch resistance of the clear lacquers prepared was carried out in accordance with DIN 55668.

The relative residual gloss in % reproduces how high the degree of gloss [20°] is after scratching in accordance with DIN 5668 compared with the degree of gloss before scratching The higher this value, the better the scratch resistance.

As Examples 5A to F clearly show, formulations E and F according to the invention are distinguished by improved scratch resistance, while retaining the good optical properties, in particular low haze.

The invention claimed is:

1. An aqueous formulation comprising

A) a copolymer a1) and a polyorganosiloxane a2) containing hydroxyl groups;

B) inorganic particles comprising silica which have an average particle size (z-mean), as determined by means of dynamic light scattering in dispersion, of less than 200 nm, wherein said inorganic particles are optionally surface modified, wherein said inorganic particles are in colloidally disperse form in organic solvents or in water, and wherein said inorganic particles are stabilized against reagglomeration by the polyorganosiloxane a2); and C) water wherein said copolymer a1) is built up from I) a hydroxy-functional hydrophobic polymer containing as builder monomers Ia) (meth)acrylic acid esters having $C_1$- to $C_{18}$-hydrocarbon radicals in the alcohol part and/or vinylaromatics and/or vinyl esters; and Ib) hydroxy-functional monomers; and II) a hydroxy-functional hydrophilic polymer containing as builder components IIa) (meth)acrylic acid esters having $C_1$- to $C_{18}$-hydrocarbon radicals in the alcohol part and/or vinylaromatics and/or vinyl esters;

IIb) hydroxy-functional monomers; and

IIc) acid-functional monomers wherein said polyorganosiloxane a2) is selected from the group consisting of (1) compounds of formula (I)

(I)

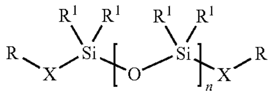

wherein

X is an aliphatic, optionally branched $C_1$ to $C_{10}$ radical or a [—$CH_2$—O—$(CH_2)_p$—]Si unit, wherein p in an integer from 1 to 4;

R is a CH(OH)Y group, wherein

Y is a —$CH_2$—N($R^2R^3$) group, wherein $R^2$ is H, a methyl, ethyl, n-propyl, iso-propyl, or cyclohexyl radical, or a 2-hydroxyethyl, 2-hydroxypropyl, or 3-hydroxypropyl radical; and $R^3$ is a 2-hydroxyethyl, 2-hydroxypropyl, or 3-hydroxypropyl radical;

$R^1$ represents a methyl group; and n is an integer from 4 to 12

(2) compounds of formula (V)

(V)

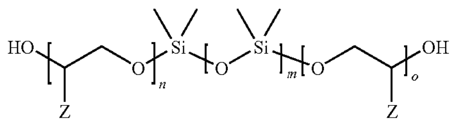

wherein m is an integer from 5 to 15;

Z is H or methyl; and n and o are, identically or differently, integers from 1 to 12, and (3) a compound of formula (VI)

(VI)

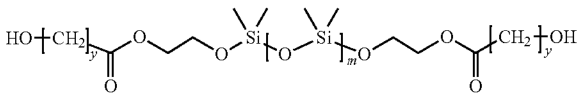

wherein m is an integer from 5 to 15; and y is an integer from 2 to 4.

2. The aqueous formulation of claim 1, wherein p is 3.

3. The aqueous formulation of claim 1, wherein said compound of formula (I) has a number-average molecular weight in the range of from 200 to 3,000 g/mol and an average OH functionality of at least 1.8.

4. The aqueous formulation of claim 1, wherein said compound of formula (I) has a number-average molecular weight of from 250 to 2,250 g/mol.

5. The aqueous formulation of claim 1, wherein said inorganic particles of B) are selected from the group consisting of inorganic oxides, mixed oxides, carbides, borides, and nitrides of elements of main group II to IV and/or elements of subgroup I to VIII of the periodic table, including the lanthanides.

6. The aqueous formulation of claim 1, wherein B) are surface-modified inorganic nanoparticles.

7. An aqueous coating composition comprising the aqueous formulation of claim 1 and at least one crosslinking agent.

8. A two-component aqueous coating composition comprising the aqueous formulation of claim 1 and a polyisocyanate.

9. A clear lacquer comprising the aqueous formulation of claim 1.

10. A process for producing an aqueous formulation comprising:

A) providing a copolymer a1);

B) providing a polyorganosiloxane a2) containing hydroxyl groups;

C) mixing inorganic particles comprising silica with a1) and/or a2), wherein the inorganic particles have an average particle size (z-mean), as determined by means of dynamic light scattering in dispersion, of less than 200 nm, wherein said inorganic particles are optionally surface modified, and wherein said inorganic particles are in colloidally disperse form in organic solvents or in water; and D) mixing components a1) and a2) before or after mixing components a1) and/or a2) with the inorganic particles;

wherein said copolymer a1) is built up from

I) a hydroxy-functional hydrophobic polymer containing as builder monomers

Ia) (meth)acrylic acid esters having $C_1$- to $C_{18}$-hydrocarbon radicals in the alcohol part and/or vinylaromatics and/or vinyl esters; and Ib) hydroxy-functional monomers; and II) a hydroxy-functional hydrophilic polymer containing as builder components IIa) (meth)acrylic acid esters having $C_1$- to $C_{18}$-hydrocarbon radicals in the alcohol part and/or vinylaromatics and/or vinyl esters;

IIb) hydroxy-functional monomers; and

IIc) acid-functional monomers wherein said polyorganosiloxane a2) is selected from the group consisting of (1) compounds of formula (I)

(I)

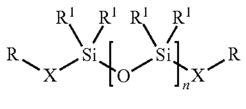

wherein

X is an aliphatic, optionally branched $C_1$ to $C_{10}$ radical or a [—$CH_2$—O—$(CH_2)_p$—]Si unit, wherein p in an integer from 1 to 4;

R is a CH(OH)Y group, wherein

Y is a —$CH_2$—N($R^2R^3$) group, wherein $R^2$ is H, a methyl, ethyl, n-propyl, iso-propyl, or cyclohexyl radical, or a 2-hydroxyethyl, 2-hydroxypropyl, or 3-hydroxypropyl radical; and $R^3$ is a 2-hydroxyethyl, 2-hydroxypropyl, or 3-hydroxypropyl radical;

$R^1$ represent a methyl group; and n is an integer from 4 to 12

(2) compounds of formula (V)

(V)

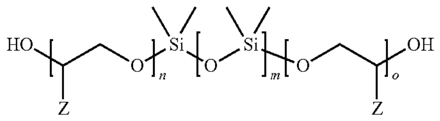

wherein m is an integer from 5 to 15;

Z is H or methyl; and n and o are, identically or differently, integers from 1 to 12, and (3) a compound of formula (VI)

(VI)

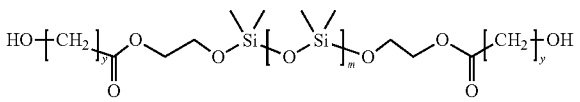

wherein m is an integer from 5 to 15; and y is an integer from 2 to 4.

11. The process of claim 10, wherein p is 3.

12. The process of claim 10, wherein said compound of formula (I) has a number-average molecular weight in the range of from 200 to 3,000 g/mol and an average OH functionality of at least 1.8.

13. The process of claim 10, wherein said compound of formula (I) has a number-average molecular weight of from 250 to 2,250 g/mol.

14. The process of claim 10, wherein said inorganic particles of B) are selected from the group consisting of inorganic oxides, mixed oxides, carbides, borides, and nitrides of elements of main group II to IV and/or elements of subgroup I to VIII of the periodic table, including the lanthanides.

15. The process of claim 10, wherein the inorganic nanoparticles are surface modified.

16. The process of claim 10, further comprising forming an aqueous coating composition from the aqueous formulation and at least one crosslinking agent.

17. A two-component aqueous coating composition comprising the aqueous formulation and a polyisocyanate, wherein the two-component aqueous coating composition is obtained according to the process of claim 16.

18. The process of claim 10, further comprising forming a clear lacquer from the aqueous formulation.

* * * * *